United States Patent Office 3,164,125
Patented Jan. 5, 1965

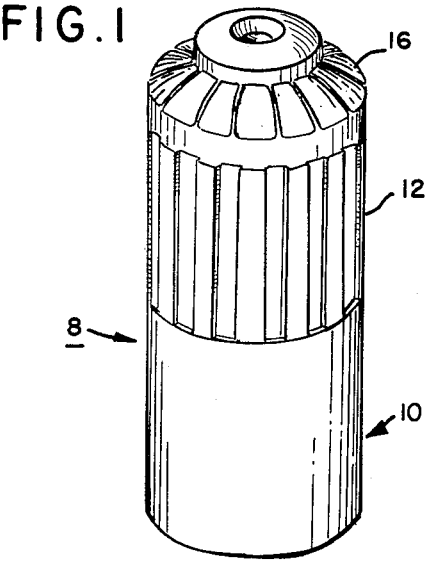
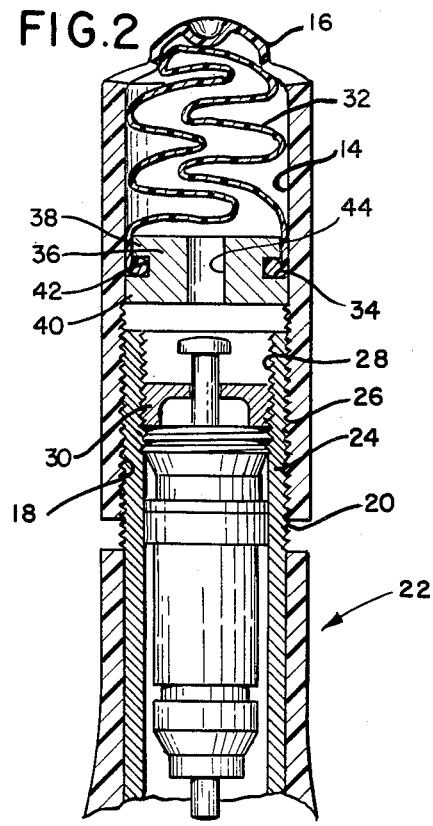
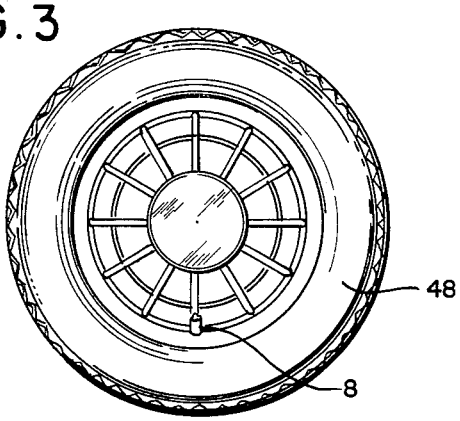
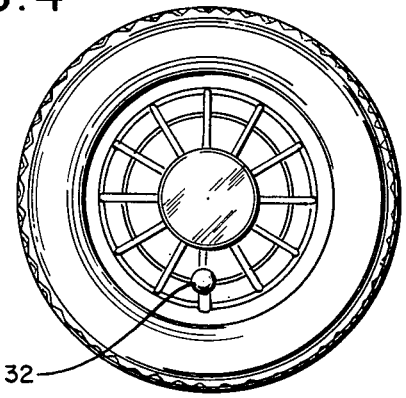

3,164,125
TIRE VALVE SAFETY CAP
James L. Stuart, 3633 N. 97th St., Milwaukee 22, Wis.
Filed Sept. 20, 1962, Ser. No. 225,021
2 Claims. (Cl. 116—34)

This invention relates to a safety device for the valve of a vehicle tire and more particularly to a visual means for indicating air leaks through the valve of the tire.

As is well known in the art, valves for the tires of automotive vehicles have a spring biased valve member which is biased in a closing direction and seated by the pressure of the air within the tire. The valve is opened by applying a higher pressure of air to the inlet side of the valve to fill the tire. These valves often become misaligned or the seals become worn so that air leaks through the valve causing a flat tire. Generally, the first step in repairing a flat tire is to remove the tire from the wheel rim and immerse it in water to determine the source of the leak. If the leak is in the valve, it can be seen that this step is unnecessary since the valve merely has to be replaced to repair the tire.

The primary object of this invention is to provide a visual indication of air leaks through the valve of an automotive or vehicle tire.

Another object of this invention is to reduce the time of checking and repairing a flat tire caused by an air leak in the valve by providing a visual indication of any air leaking through the valve of a tire.

These objects are accomplished by enclosing an expandable member within the confines of a valve cap for the valve of a tire which will expand when air leaks through the valve in a balloon-like fashion so that it becomes visible to the eye. The valve cap will protect the expandable member from foreign objects and is provided with a frangible cap that will break under pressure from the inside of the valve cap to allow the expandable member to expand exteriorly of the valve cap. The valve cap is mounted on the valve of a tire in a sealed relation so that any air which escapes from the valve will enter the interior portion of the expandable member causing it to expand. The expandable member should be of a bright colored material which is attractive to the eye so that the driver or anyone who observes the vehicle can quickly and easily see if air is leaking through the valve.

Other objects and advantages will be apparent from the following description and accompanying drawings in which:

FIG. 1 is a view of a valve cap.

FIG. 2 is a sectional view of the interior of the cap showing the balloon or expandable member positioned within the upper portion of the cap.

FIG. 3 is a view of a vehicle tire with the cap mounted on the valve.

FIG. 4 is similar to FIG. 3 with the expanded member expanded exteriorly of the cap to indicate that the valve leaks.

Referring more particularly to the drawings, the safety valve cap 8 includes a cylindrical housing 10 having an outer finger grip section 12 and a central passage 14 which is closed at one end by frangible cap 16. The passage is threaded at 18 for mounting on threaded section 20 on tire valve 22. Tire valves of this type are well known and generally have a tubular section 24 externally threaded at 26 to receive the valve cap and internally threaded at 28 to receive valve member 30. Air leaks in the valve can be caused by improper seating of the valve member in the tubular section and by malfunctioning of the valve member.

The tire valve safety cap comprises an expandable member 32 in the form of a balloon having an annular enlarged ring 34 at the inlet to the member. The expandable member is mounted on a circular disc 36 having an upper section 38 of smaller diameter than lower section 40. The two sections are separated by a groove 42 into which the annular ring 34 of the expandable member is seated with the upper section of the disc enclosed within the inlet of the expandable member. Air is admitted into the expandable member through passage 44 in the insert member.

The expandable member and disc are inserted into the central passage of the cap until the inlet portion of the expandable member surrounding the upper section of the disc sealingly engages the inner walls of the central passage. The expandable member will then be confined within the central passage in the space between the frangible cap and the disc. When the cap is screwed into the valve, the upper end of the tubular section 24 will engage the lower face of the disc 36 forcing it firmly into position within the central passage of the cap. A seal ring may be provided in the lower face of the disc to assure that the interior of the cap is air tight.

If air should leak from the valve, the expandable member will expand against the inner surface of the frangible cap until sufficient force is built up to break the cap. The expandable member will then be visible to the eye. In the normal position of the cap on tire 48, as seen in FIG. 3, the expandable member is not visible to the eye. The frangible cap is dome shaped so that it will withstand considerable external force before it breaks. When force is applied to the inside surface of the cap, it will break readily allowing the expandable member to expand as seen in FIG. 4. The expandable member can be made of a bright colored material so that it will be more easily seen when it breaks through the cap.

The cost of such caps is relatively small so they can be simply and easily replaced whenever they break the frangible section of the cap. Since this gives an immediate indication of the leak in the valve it is possible for the driver of the vehicle to replace the valve member before the tire becomes flat. Even if the tire does become flat, it will give an immediate indication of the cause of the condition of the tire whereby the tire can be quickly repaired by replacing the valve.

Although only one embodiment of the present invention has been disclosed herein, it should be obvious that various changes and modifications can be adapted which come within the scope of the appended claims.

I claim:

1. A removably attachable air leak indicator for the air valve of a vehicle tire comprising
a cylindrical housing having a central axial passage closed at one end by a frangible cap and interiorly threaded at the other end for mounting on the valve, an expandable member positioned within said passage next to said frangible cap, means for sealingly engaging said expandable member within the walls of said passage interiorly of said threaded end, and means for mounting said indicator on said valve with the interior of said expandable member in communication with the valve whereby air leaking through said valve will expand said member and break said cap so that the member is visible to the eye.

2. An air leak indicator according to claim 1 wherein said expandable member is made of a color which is attractive to the eye.

References Cited by the Examiner
UNITED STATES PATENTS

| | | | |
|---|---|---|---|
| 1,177,063 | 3/16 | Taylor | 116—34 |
| 1,236,411 | 8/17 | Downs | 116—34 |
| 1,270,073 | 6/18 | Thiem | 116—34 |
| 1,325,012 | 12/19 | Getman | 116—34 |
| 1,671,852 | 5/28 | Caldwell | 116—34 |
| 1,846,311 | 2/32 | Clare | 116—34 |
| 2,395,006 | 2/46 | Leslie | 116—124 |
| 2,806,231 | 9/57 | Hofmeister | 9—9 |
| 3,070,818 | 1/63 | Fairchild | 116—124 |
| 3,111,930 | 11/63 | Zipper | 116—34 |

LOUIS J. CAPOZI, *Primary Examiner.*